(12) United States Patent
Radkowski

(10) Patent No.: US 12,002,187 B2
(45) Date of Patent: Jun. 4, 2024

(54) ELECTRONIC DEVICE AND METHOD FOR PROVIDING OUTPUT IMAGES UNDER REDUCED LIGHT LEVEL

(71) Applicant: LENOVO (SINGAPORE) PTE. LTD, New Tech Park (SG)

(72) Inventor: Rafael Marius Radkowski, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 79 days.

(21) Appl. No.: 17/657,265

(22) Filed: Mar. 30, 2022

(65) Prior Publication Data
US 2023/0316473 A1    Oct. 5, 2023

(51) Int. Cl.
G06T 5/50    (2006.01)
G06T 3/02    (2024.01)
H04N 5/33    (2023.01)

(52) U.S. Cl.
CPC .......... *G06T 5/50* (2013.01); *G06T 3/02* (2024.01); *H04N 5/33* (2013.01); *G06T 2207/10048* (2013.01); *G06T 2207/20076* (2013.01); *G06T 2207/20084* (2013.01); *G06T 2207/20212* (2013.01); *G06T 2207/30196* (2013.01)

(58) Field of Classification Search
CPC ........ G06N 3/045; G06N 3/088; G06N 3/044; G06N 3/047; G06N 3/084; G06N 3/08; G06N 3/02; G06N 10/20; G06N 3/006; G06N 3/048; G06F 16/9535; G06F 17/16; G06F 17/18; G06F 18/214; G06F 18/2178; G06F 18/22; G06F 18/2321; G06F 18/24

USPC .......................................................... 348/164
See application file for complete search history.

(56) References Cited

U.S. PATENT DOCUMENTS

| | | | | |
|---|---|---|---|---|
| 2020/0402284 A1* | 12/2020 | Saragih | ................... | G06T 7/70 |
| 2021/0019541 A1* | 1/2021 | Wang | .................. | G06V 40/172 |
| 2021/0049468 A1* | 2/2021 | Karras | ................. | G06V 40/168 |
| 2021/0065369 A1* | 3/2021 | Yoo | ....................... | G16H 30/40 |
| 2022/0084271 A1* | 3/2022 | Shen | ........................ | G06T 11/60 |
| 2023/0112302 A1* | 4/2023 | Marks | ..................... | G06T 13/80 |
| | | | | 345/419 |
| 2023/0297634 A1* | 9/2023 | Schneider | ........... | G06F 16/9538 |
| | | | | 707/722 |

OTHER PUBLICATIONS

A. Creswell, T. White, V. Dumoulin, K. Arulkumaran, B. Sengupta and A. A. Bharath, "Generative Adversarial Networks: An Overview," in IEEE Signal Processing Magazine, vol. 35, No. 1, pp. 53-65, Jan. 2018 (Year: 2018).*

* cited by examiner

*Primary Examiner* — Masum Billah
(74) *Attorney, Agent, or Firm* — Dean D. Small; The Small Patent Law Group, LLC

(57) ABSTRACT

An electronic device is provided that includes an infrared (IR) camera configured to obtain user image data and user profile image data. The electronic device also includes a processor, and a data storage device having executable instructions accessible by the processor. Responsive to execution of the instructions, the processor generates latent space data based on the user image data and user profile image data, and forms an output image using generative modeling of the latent space data.

20 Claims, 4 Drawing Sheets

ELECTRONIC DEVICE AND METHOD FOR PROVIDING OUTPUT IMAGES UNDER REDUCED LIGHT LEVEL

BACKGROUND

Embodiments herein generally relate to methods and devices for an electronic device that has a camera for use with low or no light level.

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

Such electronic devices include cameras or other similar devices that may capture image data, video data, or the like. Typically these cameras are small-sized sensors that are embedded in the bezels of the electronic device. These small-sized sensors suffer from a variety of quality degrading effects. Noise, color shifts, and color model artifacts are just three. The problem magnifies in low-light conditions and darkness where noise becomes more noticeable and faces can disappear. Consequently, video conferencing and similar applications provide an unsatisfying user experience.

SUMMARY

In accordance with embodiments herein, an electronic device is provided that includes an infrared (IR) camera configured to obtain user image data and user profile image data. The electronic device also includes a processor, and a data storage device having executable instructions accessible by the processor. Responsive to execution of the instructions, the processor generates latent space data based on the user image data and user profile image data, and forms an output image using generative modeling of the latent space data.

Optionally, to generate the latent space data, the processor is further configured to model the user profile image data and user image data obtained by the IR camera using a probability distribution. In one aspect, the processor is further configured to obtain model image data, and model the user image data with the model image data to generate the latent space data. In another aspect, the model image data includes plural images of individuals other than a user. In one example, to generate the latent space data, the processor is further configured to provide affine transformation mapping of the user profile image data and the user image data obtained by the IR camera.

Optionally, to form the output image using generative modeling includes generative modeling the latent space data with noise with a first generative adversarial network to provide an encoded input for a second generative adversarial network that forms the output image. In one aspect, the processor is further configured to prompt a user to provide the user profile image data. In another aspect, a user appearance network generates the latent space data, and a synthesis network forms the output image. In one example, the IR camera is a red-green-blue IR camera. In another example, the IR camera is coupled to a bezel of the electronic device.

In accordance with embodiments herein, a method is also provided, under control of one or more processors including program instructions to obtain user image data and user profile image data from an infrared (IR) camera. The method also includes to generate latent space data based on the user image data and user profile image data, and form an output image using generative modeling of the latent space data.

Optionally, the method also includes, under the control of the one or more processors including program instructions to, model the user profile image data and user image data obtained by the IR camera using a probability distribution to generate the latent space data. In one aspect, the method additionally includes, under the control of the one or more processors including program instructions to, obtain model image data, and model the user image data with the model image data to generate the latent space data. In another aspect, the method further includes under the control of the one or more processors, including program instructions to, provide affine transformation mapping of the user profile image data and the user image data to generate the latent space data. In one example, the method also includes under the control of the one or more processors, including program instructions to, generative model the latent space data with noise with a first generative adversarial network to provide an encoded input for a second generative adversarial network that forms the output image.

In accordance with embodiments herein, a computer program product is provided that includes a non-signal computer readable storage medium comprising computer executable code to automatically obtain user image data and user profile image data, generate latent space data with a user appearance network based on the user image data and user profile image data, and form an output image with a synthesis network using generative modeling of the latent space data.

Optionally, the computer program product also includes computer executable code to automatically model the user profile image data and user image data obtained using a probability distribution to generate the latent space data. In one aspect, the computer program product further includes executable code to automatically obtain model image data, and model the user image data with the model image data to generate the latent space data. In another aspect, the computer program product additionally includes computer executable code to automatically provide affine transformation mapping of the user profile image data and the user image data to generate the latent space data. In one example, the computer program product also includes computer executable code to automatically generative model the latent space data with noise with a first generative adversarial network to provide an encoded input for a second generative adversarial network that forms the output image.

DETAILED DESCRIPTION

Figure 1:
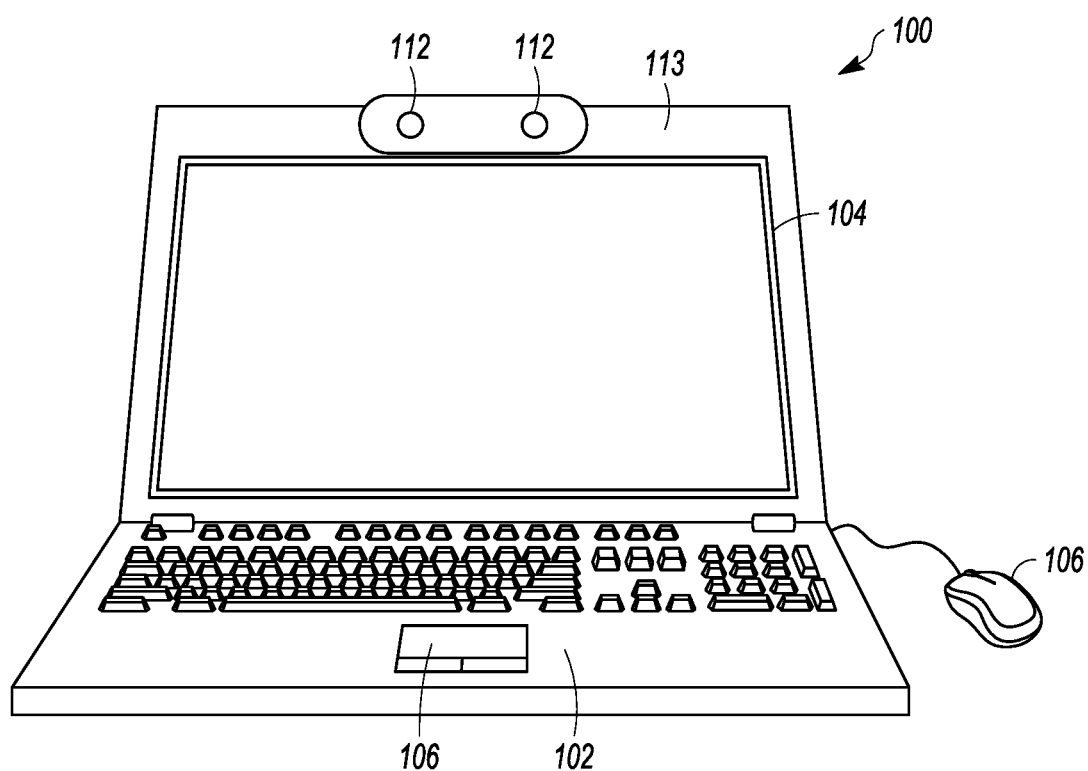
FIG. 1 illustrates an front view of an electronic device, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The phrase "user image data" as used herein refers to any and all data obtained from a camera, including an infrared (IR) camera that includes the user of the electronic device. User image data includes images, videos, still photos, or the like, obtained by the camera. The user image data may be constructed, reconstructed, changed, altered, etc. prior to generating an output image.

The phrase "user profile image data" as used herein refers to user image data related to a user that is obtained at a first time and then used with user image data related to the user at a second time to generate an output image. The user profile image data can include plural images of the user that in an example are used as baseline images. The baseline images are then modeled with user image data to generate latent space data. The user profile image data is typically stored in a storage device or memory for later use at a second time. The user profile image data can be user image data that is altered or unaltered before being stored in a storage device or memory.

The phrase "model image data" as used herein refers to image data related to images of individuals other than a user to be utilized during modeling. The model image data may be utilized by a model with user image data to generate latent space data. The model image data can include images of real life individuals, and images of individuals who do not exist, and instead are generated by an electronic device. The model image data can include thousands or more of images that include individuals with differing skin color, skin type, facial features, eye color, hair color, etc.

The phrase "latent space data" as used herein refers to any and all representations of compressed data in which similar data points are closer together in space. The latent space data may be formed by providing a distribution map, including an affine distribution map of user image data, user profile image data, and/or model image data. In this manner, one of the data points of the latent space data may be from user image data being presently captured, while another data points of the latent space data may be from the user profile image data, and/or model image data.

The phrase "output image" as used herein refers to an image provided on an output device of an electronic device. The output device may be a screen, display, or the like. The electronic device may be an electronic device that includes a camera that obtains user image data from which the output image is based, or may be an electronic device that receives the output image from the electronic device that obtains the user image data from which the output image is based.

The phrase "affine transformation mapping" as used herein refers to a mapping technique that provides for geometric transformation that maintains lines and parallelisms, but permits distances between lines to be varied. The mapping technique in one example is used herein to map, or place data points, of user image data, user profile image data, and/or model image data in relation to each other.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the primary electronic device and a secondary electronic device, and/or iii) receiving the data, signals, information, etc. at a remote server over a network connection. The obtaining operation, when from the perspective of a primary electronic device, may include sensing new signals in real time, and/or accessing memory to read stored data, signals, information, etc. from memory within the primary electronic device. The obtaining operation, when from the perspective of a secondary electronic device, includes receiving the data, signals, information, etc. at a transceiver of the secondary electronic device where the data, signals, information, etc. are transmitted from a primary electronic device and/or a remote server. The obtaining operation may be from the perspective of a remote server, such as when receiving the data, signals, information, etc. at a network interface from a local external device and/or directly from a primary electronic device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided that enhance video quality in low-light and absolute darkness to match a video appearance in perfect light conditions. An infrared camera is utilized to obtain user image data. The obtained user image data is then modeled with user profile image data and/or model image data stored in a memory to form latent space data. The latent space data represents the user by providing a distribution map, such as an affine distribution map using all three sets of image data (i.e. user image data, user profile data, and model image data). Because the latent space data is dependent on the user profile image data and/or model image data that is utilized for forming the latent space data instead of using just the user image data, the artifact, noise, color shifting, and other errors often caused by having low light or no light/darkness condition when using only user image data for the output image are corrected.

FIG. 1 illustrates an example electronic device 100. While illustrated as a laptop, in other example embodiments the electronic device may be a smart phone, tablet, portable electronic device, or the like. The electronic device includes a an input device 102 that in this example is a keyboard that is hingedly coupled to a display 104. The electronic device 100 may also include an auxiliary input device 106 such as a touch pad, a mouse that is coupled either through a cord, such as a USB cord, or wirelessly, or the like. The auxiliary input device 106 may be provided for inputting data and information into the electronic device.

The electronic device 100 can also include one or more sensors 112. The one or more sensors can include a camera, microphone, or the like. In one example the sensor 112 is an infrared (IR) camera such as a red-green-blue infrared (RGB/IR) camera. The IR camera can be coupled to, including being placed on, a bezel 113 of the electronic device 100 to obtain IR image data. In one example, the IR image data is user image data obtained from a user. The IR camera is able to detect an individual or user at the electronic device, even when there is little to no light in the environment. In this manner, the electronic device 100 can include an image application that obtains the user image data from the IR camera, and then any part of the user image data that is missing, incomplete, etc. can be reconstructed based on a model that includes user image data of the user previously obtained (e.g. user profile image data) and additional image data (e.g. model image data).

The image application includes a user appearance network that generates latent space data by modeling user image data with the user profile image data and/or the model image data. The modeling forms a latent space distribution P(I|IR, U) that maps the user image data from an IR camera to the general shape of the user and the user's motion. In one example, the user appearance network encodes an affine transformation mapping of the action and the user profile image data to a probability distribution. A synthesis network uses the latent space representation (e.g. the latent space data) to synthesize a new output image using the user profile image and noise as input, where the user profile image poses the input signal. The synthesis network transforms the user profile image into an output image matching the shape and likeness the latent space data represents. Individual stages in the network architecture adapt different parts of the user. Because the output image quality depends on the training, or model data and the user profile image data, the output image's light condition is decoupled from the actual light situation. Thus, the image output shows enhanced, and even perfect light conditions.

In one example, the user profile image data can be obtained by the image application by prompting a user to provide the user profile image data. For example, when the image application is first installed, a prompt may be provided to obtain the user profile image data. In this manner, the user may decide to provide images that include the user in certain clothing that is utilized when doing work calls, other clothing such as hats for personal imagery, etc. Similarly, a certain hairstyle, pair of glasses, or the like can be provided in different profile image images. To this end, a user may choose to edit or change their appearance to accent different facial features, hide imperfections, wrinkles, or the like. Similarly, if an individual updates their look, obtains new clothing, loses a significant amount of weight, obtains a new hairstyle, or the like, after the original user profile images, or first time, the user can provide updated user profile images at a later or second time. By having the user provide updated user profile images, the image application can more easily recognize, detect, match, etc. image data when using the user profile image data to generate an output image at a later time using a user appearance network to assist in generating the output image.

Figure 2:
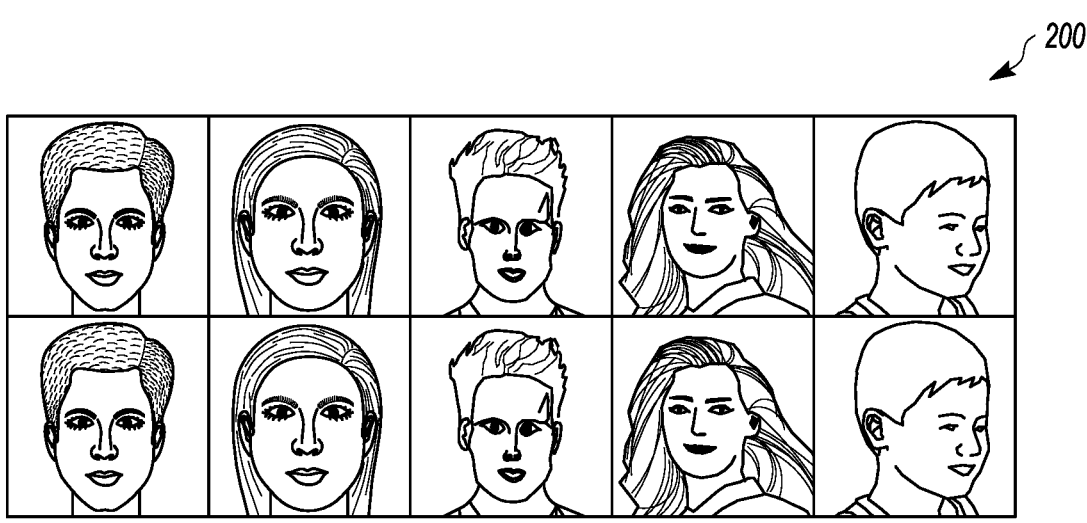
FIG. 2 illustrates a schematic view of model image data, in accordance with embodiments herein.

In an example, the model image data can include numerous images of thousands and thousands (or more) of individuals. FIG. 2 illustrates an example of some of the numerous images that may be utilized as sample images 200 for the model image data. The individuals may each have differing skin tones, facial features, eye coloring, hair coloring, hair styles, or the like. The individuals of the numerous images utilized from the model image data may be actual real life individuals, computer generated individuals, or the like. Each provides different facial features, characteristics, etc. that may be utilized by the image application to produce an output image.

By using user image data along with the user profile image data, and/or the model image data in a generative image reconstruction process to generate an output image instead of attempting to obtain additional image data from additional sensors, errors that occur when using such devices in low light and no light settings is eliminated. In the generative image reconstruction process, an image is reconstructed from obtained data instead of forming an image and then attempting to correct problems associated with the already formed image. As a result, enhanced imaging is provided.

Figure 3:
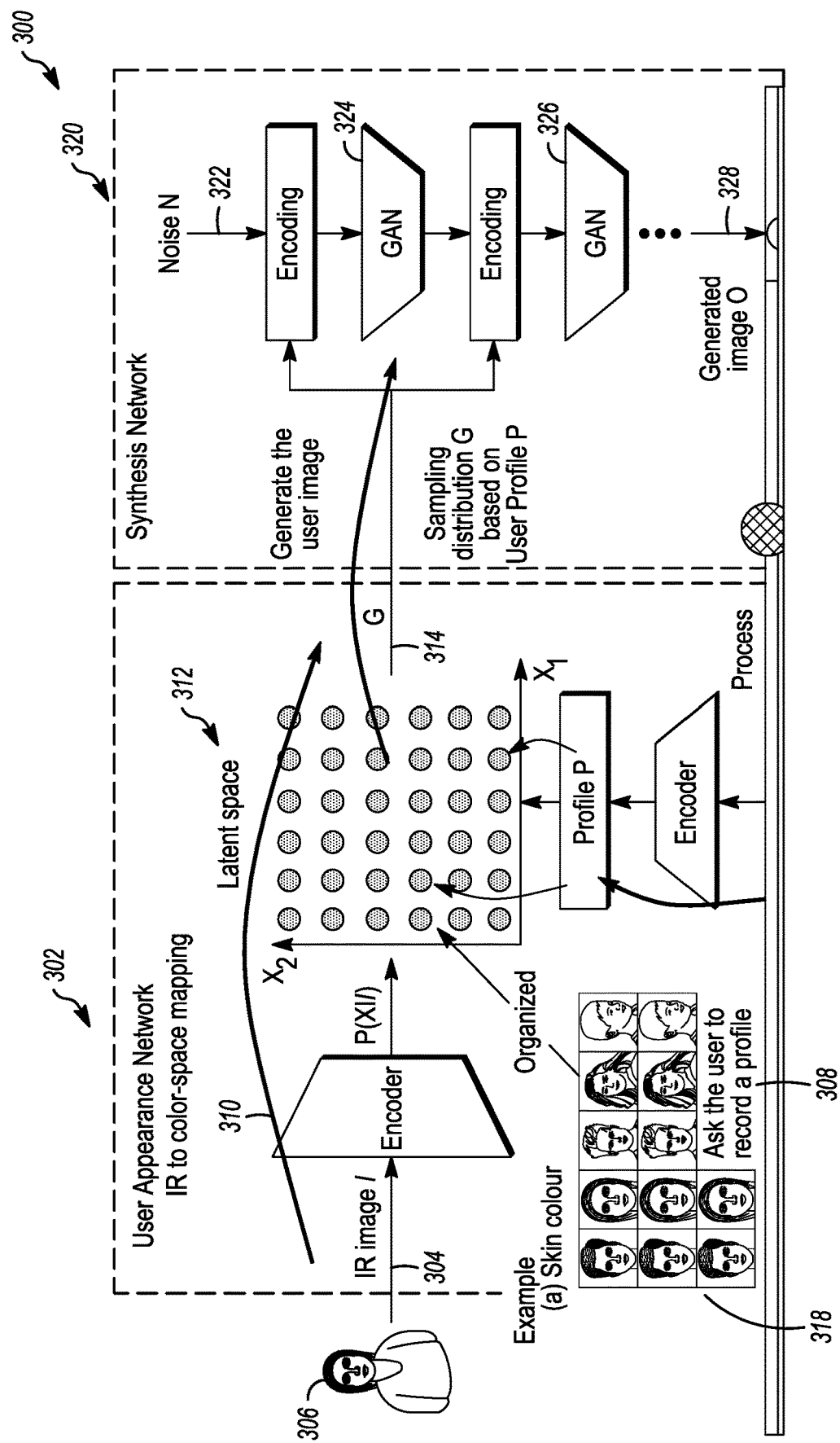
FIG. 3 illustrates a schematic view of an image application, in accordance with embodiments herein.

FIG. 3 illustrates a schematic diagram of an image application 300 utilized to form an output image of a user, including in low light and darkness/no light conditions. The image application can be a program, application, part of a program or application, or the like. The application 300 may include software, hardware, circuitry, processors, etc. to implement the functions of the application 300.

The image application 300 includes a user appearance network 302 that obtains user image data 304 from a user 306. The user image data 304 can include user profile image data 308 that is obtained at a first time and is stored in a memory, or storage device. The user image data 304 may also be obtained at a second time when a camera such as an IR camera is in use, including during operation of a web-conferencing application. In one example, the camera may be an IR camera configured to capture user image data in low light and darkness.

At the second time, after the user image data 304 is captured by the IR camera, a first encoder 310 is provided to transform the user image data 304 that is IR based data into user image data 304 that is color based data. In particular, the first encoder 310 generates a latent space distribution P(I|IR, U) 312 to generate latent space data 314 that can include both the user image data 304 being obtained and the user profile image data 308 previously obtained.

The latent space distribution 312 maps the IR image data, or user image data 304 obtained at the second time, to provide a general shape of the user 306 and the motion of the user 306. At this time, a second encoder 316 is also provided that retrieves the user profile image data 308 from the memory along with model image data 318 that includes numerous images of individuals having different facial colors, features, or the like. In one example, the second encoder 316 includes a model that utilizes the user profile image data 308 and/or the model image data 318 to reconstruct the IR image data to form the latent space data 314. In this manner, the latent space data 314 is a combination of the IR image data and the image data of the model of the second encoder 316. By using the user profile image data 308 and/or the model image data 318, color, shape, contour, etc. can be refined, added, corrected, enhanced, or the like, when forming the latent space data 314.

The model of the second encoder 316 may include an algorithm, artificial intelligence algorithm, mathematical model, function, lookup table, decision tree, or the like used to generate image data utilized in reconstructing the IR image data to form the latent space data 314. In one example, the model includes a probability distribution in reconstructing the IR image data. In one example, the user appearance network 302 encodes an affine transformation mapping the action and the user profile data to a probability distribution.

Overall, the user appearance network 302 transforms the user image data 304, user profile image data 308, and/or model image data 318 into an output image matching the shape and likeness of selected latent space data 314. In particular, individual stages in the user appearance network architecture adapt different parts of the user 306. Because the output image quality depends on the training, or model image data 318 and the user profile image 308, the output image's light condition is decoupled from the actual light situation. Thus, the image shows enhanced, and even perfect light conditions.

Once the latent space data 314 is constructed, formed, created, etc. the latent space data 314 may be provided to a synthesis network 320 of the image application 300 to generate the user output image. The synthesis network 320 uses the latent space representation to synthesize a new image output using the user profile image data 308 and noise 322 as inputs. Here, the user profile image poses the input signal.

In one example, a first generative adversarial network (GAN) 324 receives the noise 322 and latent space data 314 after encoding. The GAN is a neural network architecture used to provide generative modeling of image data, such as the latent space data 314. The first GAN 324 is provided to filter out potential noise 322 that effects the latent space data 314. Optionally, a second GAN 326 receives an encoded input from the first GAN 324 and the latent space data 314 to provide an output image 328. Thus, by using the combination of an IR camera along with the user profile image data and model image data to form the latent space data 314 before providing the latent space data 314 to the synthesis network 320, an improved output image 328 is provided in low light and no light conditions. In particular, the synthesis network 320 generates a new output image from the user 306 using the latent space data 314 as input, user profile image data, and noise. Thereby, it aligns the user profile image to the current user pose given in the latent space. Unlike typical GANs, it does not generate a random output image but shows the actual user. Because the user appearance network 302 does not depend on camera-based improvements to enhance the imaging and instead reconstructs or forms the latent space data 314 from a model, camera-based issues such as artifacts, color shifts, or the like can be eliminated. Thus, a clearer image of a user is provided in both low light and darkness.

Figure 4:
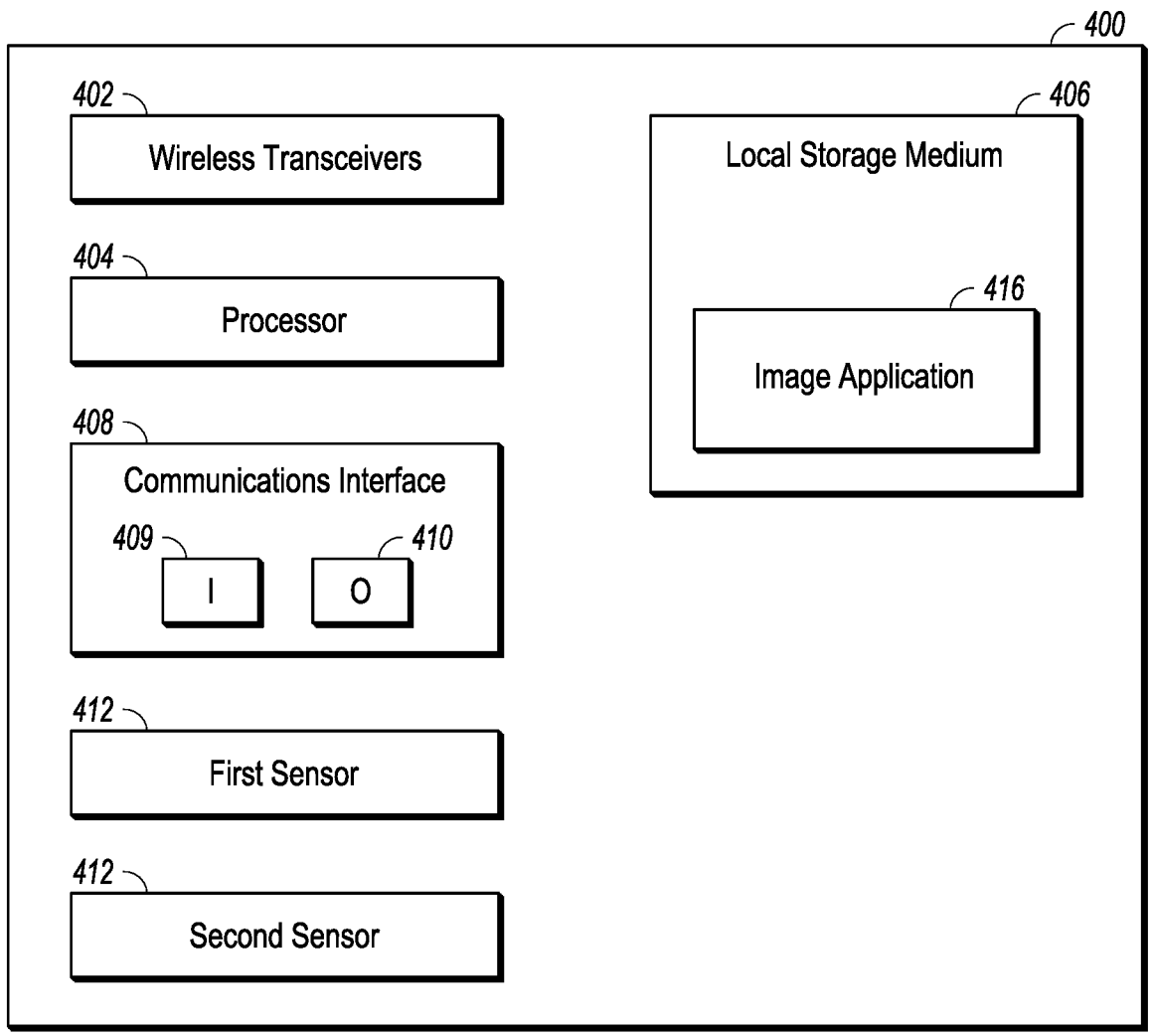
FIG. 4 illustrates a schematic view of an electronic device, in accordance with embodiments herein.

FIG. 4 illustrates a simplified block diagram of an electronic device 400 configured to provide enhanced or clear images when under low light or no light conditions. In one example, the electronic device 400 is the electronic device of FIG. 1. The electronic device 400 includes components such as one or more transceivers 402, one or more processors 404 (e.g., a microprocessor, microcomputer, application-specific integrated circuit, etc.), and one or more local storage medium (also referred to as a memory portion) 406.

The local storage medium 406 can encompass one or more memory devices of any of a variety of forms (e.g., read only memory, random access memory, static random access memory, dynamic random access memory, etc.) and can be used by the one or more processors 404 to store and retrieve data. The data that is stored by the local storage medium 406 can include, but need not be limited to, profile images, settings data, application data, operating systems, applications, obtained data, user profile image data, additional image data, model image data, latent space data, environmental characteristics data, etc. Each application and operating system includes executable code that controls basic functions of the device, such as interaction among the various components, communication with external devices via the transceivers 402, and storage and retrieval of applications, context data, etc. to and from the local storage medium 406.

The electronic device 400 in one embodiment also includes a communications interface 408 that is configured to communicate with a network resource. The communications interface 408 can include one or more input devices 409 and one or more output devices 410. The input and output devices 409, 410 may each include a variety of visual, audio, and/or mechanical devices. For example, the input devices 409 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. In one example, at least one input device is an RGB/IR camera.

The electronic device 400 can also include one or more sensors 412. The one or more sensors can be configured to obtain environmental data related to the environment of the user. The one or more sensors 412 may include light level or detector sensors, infrared sensors, etc.

The electronic device 400 may also include an image application 416. In an example, the image application 416 is the image application of FIG. 3. In one example, the image application 416 includes instructions to access information and data of the electronic device. The image application 416 may provide methods or processes for improving an image captured by a camera of the electronic device 400 when the electronic device is in low lighting or no lighting conditions. When used herein, low lighting or no lighting conditions refer to any lighting in the environment that would cause degraded image quality if not for the image application 416.

The image application 416 can include instructions to obtain user profile image data. In one example, image application prompts a user to take a picture of themselves with an input device or sensor, such as an IR camera. Alternatively, the image application 416 can include instructions, requests, etc. to have the user input, upload, download, etc. user profile image data. In one example, the instructions may also include a determination regarding the lighting level at the time the user profile image data is obtained. In one example, a sensor may detect the light level within the environment. In particular, to provide the best baseline image, the image application 416 can determine the light level, and recommend the amount of light in the environment be increased to facilitate obtaining user profile image data that is as accurate as possible.

The user may also decide to provide images that include the user in certain clothing that is utilized when doing work calls, other clothing such as hats for personal imagery, etc. Similarly, a certain hairstyle, pair of glasses, or the like can be provided in different profile images. To this end, a user may choose to edit or change their appearance to accent different facial features, hide imperfections, wrinkles, or the like. Similarly, if an individual updates their look, obtains new clothing, or a new hairstyle, or the like, after the original user profile images, or first time, the user can provide updated user profile images at a later or second time. By having plural user profile images, the image application can more easily recognize, detect, match, etc. image data when using the user profile image data to reconstruct latent space data to generate an image at a later time using a user appearance network.

The image application 416 can also have instructions to receive or obtain user image data from a user through a camera or sensor such as an IR camera. The image application 416 may include model image data, model(s), GANs, etc. to reconstruct, or generate an output image using a generative image reconstruction process based on the obtained user image data. The output image is thus based on the user image data, and the user profile image data to prevent artifacts, color shifts, etc. and to ensure a clear output image, even in low light and no light or darkness conditions.

Figure 5:
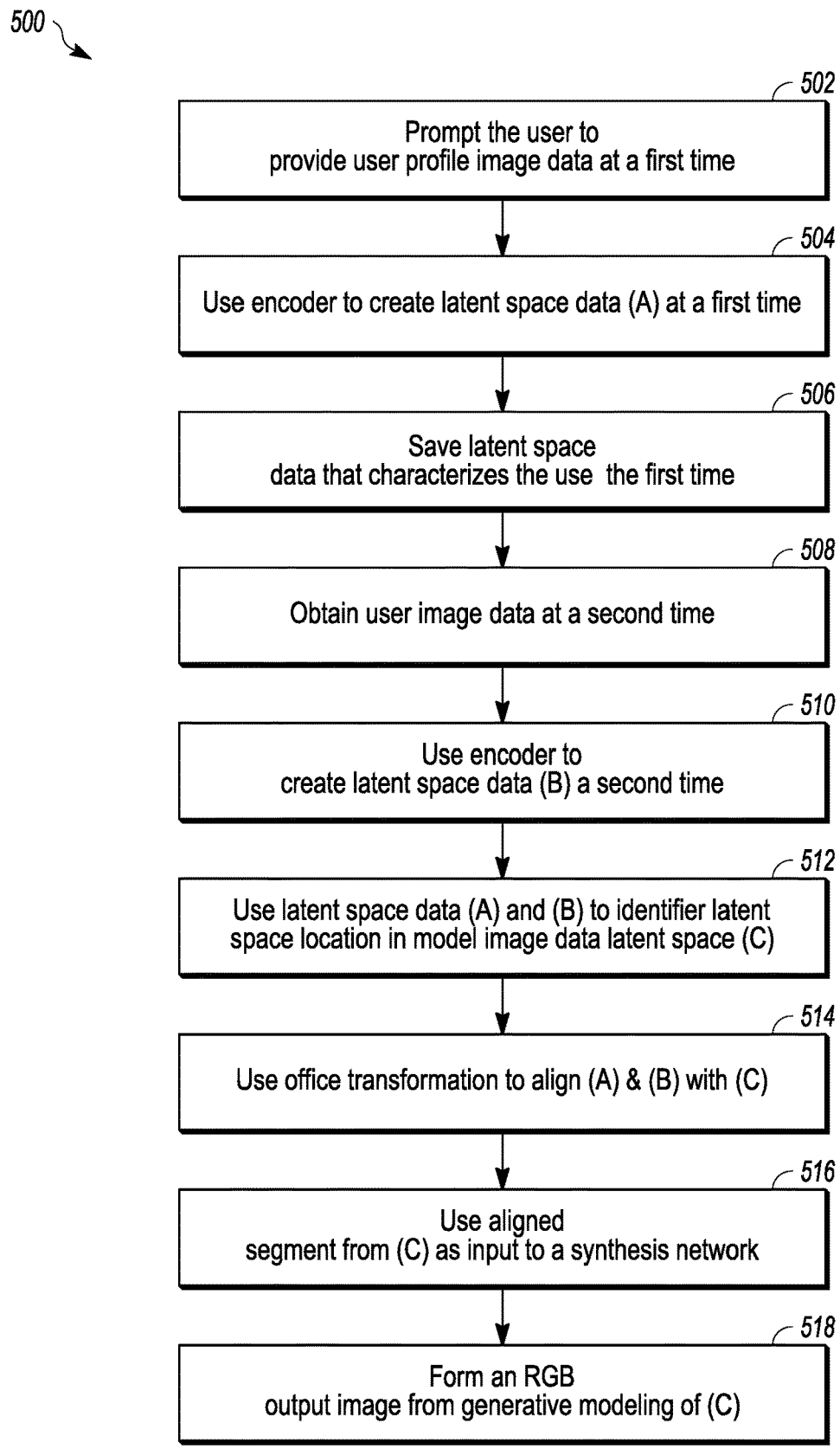
FIG. 5 illustrates a schematic block diagram of a process for generating an output image, in accordance with embodiments herein.

FIG. 5 illustrates a process 500 for filtering user image data to provide an image output that remains clear in low light and no light environments. In one example, the electronic device of FIGS. 1 and 4, and/or the image application of FIG. 3 are utilized to perform the process.

At 502, one or more processors prompt a user to provide user profile image data at a first time. The user profile image data includes one or more user images, videos, etc. These images then function as baseline images for the individual. The one or more processors can prompt the user by providing a prompt box, a form, an input, or the like. In one example, the user may have the option to take multiple user profile images and select the images they desire to be the user profile images. In another example, the user can provide touchups, or alter the provided user profile images to ensure the user is satisfied with the user profile image(s) provided. The one or more processors can prompt the user at an initial or first time. Then, the one or more processors may provide a second prompt at a second time to update the user profile image(s). In one example, after a year, the one or more processors again prompt the user so that updated user profile image(s) can be provided. Alternatively, the user may actuate an imaging application to indicate that updated user profile image(s) are desired to be provided.

At 504, one or more processors obtain user image data at a second time. In one example, a web conferencing application is launched for having a meeting with other individuals, and in response a sensor, or camera begins obtaining user image data. In another example, a calling application is utilized to provide facetiming between two individuals on two separate electronic devices. In yet another example, a user may be recording a speech, presentation, or the like to be replayed to other individuals at a later time. In each instance, a camera, and in one example an IR camera, begins capturing user image data that includes the user, user movement, and the environment of the user at the second time.

At 506, the one or more processors construct the user image data and user profile image data to form latent space data. In one example, an image application is provided that includes a user appearance network that constructs the user image data using the user profile image data, and/or model image data using a sampling distribution. The model image data may include image data of other individuals, whether existing in real-life or generated by an electronic device, to provide numerous individuals to base the reconstruction. In one example an affine transformation mapping technique is utilized so that the latent space is adapted to the user to form the latent space data. By utilizing the user profile image data and/or model image data after obtaining the user image data to form the latent space data, instead of adjusting, correcting, etc. the user image data itself, errors from artifacts, noise, color shifting, or the like are eliminated.

At 508, the one or more processors provide the latent space data to a synthesis network to provide generative modeling of the latent space data to form the output image. In one example, a first GAN, and second GAN are utilized, and include noise as an input to form the output image. In another example, more than two GANs may be used to form the output image. Still, as a result of the latent space data being dependent on the user profile image data and/or model image data that is utilized for reconstruction of the user image data, the artifact, noise, color shifting, and other errors often caused by having low light or no light/darkness condition when using image data for the output image are corrected.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a data storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
   an infrared (IR) camera configured to obtain user image data and user profile image data;
   a processor;
   a data storage device having executable instructions accessible by the processor;
   wherein, responsive to execution of the instructions, the processor:
   generates latent space data based on the user image data and user profile image data;
   obtains model image data including at least one image of an individual other than the user, and model the user image data with the model image data to generate the latent space data; and
   forms an output image of the user using generative modeling of the latent space data based on the user image data and the model image data.

2. The electronic device of claim 1, wherein to generate the latent space data, the processor is further configured to model the user profile image data and user image data obtained by the IR camera using a probability distribution.

3. The electronic device of claim 1, wherein the model image data utilized to form the output image of the user includes plural images of individuals other than a user.

4. The electronic device of claim 1, wherein to generate the latent space data, the processor is further configured to provide affine transformation mapping of the user profile image data and the user image data obtained by the IR camera.

5. The electronic device of claim 1, wherein to form the output image using generative modeling includes generative modeling the latent space data with noise with a first generative adversarial network to provide an encoded input for a second generative adversarial network that forms the output image.

6. The electronic device of claim 1, wherein the processor is further configured to:
   prompt a user to provide the user profile image data.

7. The electronic device of claim 1, wherein a user appearance network generates the latent space data, and a synthesis network forms the output image.

8. The electronic device of claim 1, wherein the IR camera is a red-green-blue IR camera.

9. The electronic device of claim 1, wherein the IR camera is coupled to a bezel of the electronic device.

10. The electronic device of claim 1, wherein the at least one image of the individual other than the user includes a first image generated by the electronic device and a second image of a real life individual that is not the user.

11. A method, comprising:
under control of one or more processors including program instructions to:
obtain user image data and user profile image data from an infrared (IR) camera;
generate latent space data based on the user image data and user profile image data;
obtain model image data including at least one image of an individual other than the user, and model the user image data with the model image data to generate the latent space data; and
form an output image of the user using generative modeling of the latent space data based on the user image data and the model image data.

12. The method of claim 11, further comprising under the control of the one or more processors including program instructions to model the user profile image data and user image data obtained by the IR camera using a probability distribution to generate the latent space data.

13. The method of claim 11 further comprising under the control of the one or more processors including program instructions to provide affine transformation mapping of the user profile image data and the user image data to generate the latent space data.

14. The method of claim 11, further comprising under the control of the one or more processors including program instructions to generative model the latent space data with noise with a first generative adversarial network to provide an encoded input for a second generative adversarial network that forms the output image.

15. The method of claim 11, further comprising generating the at least one image of the individual other than the user.

16. A computer program product comprising a non-signal computer readable storage medium comprising computer executable code to automatically:
obtain user image data and user profile image data;
generate latent space data with a user appearance network based on the user image data and user profile image data;
obtain model image data including at least one image of an individual other than the user, and model the user image data with the model image data to generate the latent space data; and
form an output image of the user with a synthesis network using generative modeling of the latent space data based on the user image data and the model image data.

17. The computer program product of claim 16, further comprising computer executable code to automatically model the user profile image data and user image data obtained using a probability distribution to generate the latent space data.

18. The computer program product of claim 16, further comprising computer executable code to automatically provide affine transformation mapping of the user profile image data and the user image data to generate the latent space data.

19. The computer program product of claim 16, further comprising computer executable code to automatically generative model the latent space data with noise with a first generative adversarial network to provide an encoded input for a second generative adversarial network that forms the output image.

20. The computer program product of claim 16, further comprising computer executable code to generate the at least one image of the individual other than the user.

* * * * *